(12) United States Patent
Lin et al.

(10) Patent No.: US 11,145,870 B2
(45) Date of Patent: Oct. 12, 2021

(54) METHOD FOR PRODUCING AN INFILTRATED SOLID OXIDE FUEL CELL LAYER

(71) Applicant: PHILLIPS 66 COMPANY, Houston, TX (US)

(72) Inventors: Ye Lin, Bartlesville, OK (US); Ying Liu, Bartlesville, OK (US); Mingfei Liu, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 44 days.

(21) Appl. No.: 16/710,657

(22) Filed: Dec. 11, 2019

(65) Prior Publication Data

US 2020/0194803 A1 Jun. 18, 2020

Related U.S. Application Data

(60) Provisional application No. 62/778,745, filed on Dec. 12, 2018.

(51) Int. Cl.
*H01M 4/90* (2006.01)
*H01M 8/124* (2016.01)

(52) U.S. Cl.
CPC .. *H01M 4/9025* (2013.01); *H01M 2008/1293* (2013.01)

(58) Field of Classification Search
CPC .................................................. H01M 4/8892
See application file for complete search history.

(56) References Cited

U.S. PATENT DOCUMENTS

| | | | |
|---|---|---|---|
| 2002/0102450 A1* | 8/2002 | Badding | H01M 8/0206 429/465 |
| 2002/0187389 A1* | 12/2002 | Wallin | H01M 4/9033 429/489 |
| 2005/0019649 A1 | 1/2005 | Kakutani et al. | |
| 2012/0244456 A1 | 9/2012 | Muecke et al. | |
| 2013/0143142 A1 | 6/2013 | Liu et al. | |
| 2015/0004518 A1* | 1/2015 | Isaka | H01M 8/12 429/458 |
| 2015/0099211 A1* | 4/2015 | Bierschenk | H01M 8/1246 429/483 |

OTHER PUBLICATIONS

PCT Notification of Transmittal of the International Search Report and the Written Opinion of the International Searching Authority, or the Declaration; International Application No. PCT/US2019/065709; International Filing Date: Dec. 11, 2019; 14 pages.

* cited by examiner

*Primary Examiner* — Brian R Ohara
(74) *Attorney, Agent, or Firm* — Phillips 66 Company

(57) ABSTRACT

A method of producing an infiltrated solid oxide fuel cell (SOFC) layer. The method begins by infiltrating a solution containing a solute into a SOFC layer to produce a primary SOFC layer. The primary SOFC layer is then dried in a heated environment, wherein the heated environment ranges in temperature from about 25° C. to about 100° C. to produce a dry primary SOFC layer. The dry primary SOFC layer is then cooled at a rate less than about 5° C./min to room temperature to produce a cooled primary SOFC layer. The cooled primary SOFC layer is then heated to a temperature greater than 500° C. then quenching to a temperature from about 10° C. to about 30° C. to produce an infiltrated SOFC layer.

5 Claims, 10 Drawing Sheets

METHOD FOR PRODUCING AN INFILTRATED SOLID OXIDE FUEL CELL LAYER

CROSS-REFERENCE TO RELATED APPLICATIONS

This application is a non-provisional application which claims the benefit of and priority to U.S. Provisional Application Ser. No. 62/778,745 filed Dec. 12, 2018, titled "Method for Producing an Infiltrated Solid Oxide Fuel Cell Layer," which is hereby incorporated by reference in its entirety.

STATEMENT REGARDING FEDERALLY SPONSORED RESEARCH OR DEVELOPMENT

None.

FIELD OF THE INVENTION

This invention relates to a method for producing an infiltrated solid oxide fuel cell layer.

BACKGROUND OF THE INVENTION

Reducing operating temperature could effectively improve lifetime and lower the material and operating costs of solid oxide fuel cell (SOFC) systems. To achieve this goal, new materials with better electrochemical properties and structures with miniature features can be used. It is generally agreed that SOFC performance is dominated by the oxygen reduction and incorporation processes in the cathodes, especially at low operating temperatures (i.e., <650° C.). At low temperatures, cathode performance is affected not only by its inherent characteristics such as conductivity but also by its surface chemistry and morphology.

Most state-of-the-art cathode materials contain significant amounts of alkaline elements (Ba, Ca, and Sr), which have the tendency to react with the $CO_2$ and moisture present in ambient air. There has been tremendous effort expended in developing new cathodes that are able to function better at low temperatures in terms of both electrochemical performance and stability. Generally, there are two approaches to improving cathode performance. The first is to develop totally new cathode materials with higher bulk catalytic properties. However, it is extremely difficult, if not impossible, to develop totally new material systems with much higher performance. The second is to modify the surface conditions of the existing electrode materials by applying a thin layer of new materials with extremely high electro- chemical activity or surface area to backbones made of conventional cathode materials. Modifying the surface conditions dramatically increases the number of active oxygen reduction reaction sites (triple phase boundaries) and significantly reduces the electrode polarization resistances, while preserving the high electrochemical properties of the backbone materials. In addition, the stability of the backbone cathode can be improved because the highly reactive, mobile alkaline elements in the backbone cathode will be isolated by the functional surface coating.

There exists a need to create an infiltrated cathode capable of operating as a SOFC.

BRIEF SUMMARY OF THE DISCLOSURE

A method of producing an infiltrated solid oxide fuel cell (SOFC) layer. The method begins by infiltrating a solution containing a solute into a SOFC layer to produce a primary SOFC layer. The primary SOFC layer is then dried in a heated environment, wherein the heated environment ranges in temperature from about 25° C. to about 100° C. to produce a dry primary SOFC layer. The dry primary SOFC layer is then cooled at a rate less than about 5° C./min to room temperature to produce a cooled primary SOFC layer. The cooled primary SOFC layer is then heated to a temperature greater than 500° C. then quenching to a temperature from about 10° C. to about 30° C. to produce an infiltrated SOFC layer. The desired catalyst loading can be achieved by repeating the above process.

A method of producing an infiltrated solid oxide fuel cell (SOFC) cathode layer. The method begins by infiltrating a first solution containing a first solute into a SOFC cathode to produce a primary SOFC cathode. The primary SOFC layer is then dried in a heated environment, wherein the heated environment ranges in temperature from about 25° C. to about 100° C. to produce a dry primary SOFC layer. The dry primary SOFC layer is then cooled at a rate ranging from about 1° C./min to about 5° C./min to room temperature to produce a cooled primary SOFC layer. A second solution containing a second solute is then infiltrated into the room temperature primary SOFC cathode to produce a secondary SOFC cathode. The secondary SOFC cathode is then subjected to a heated environment at a temperature from about 25° C. to about 100° C. for less than one hour to produce a dry secondary SOFC cathode. The heated secondary SOFC cathode is then cooled at a rate ranging from about 1° C./min to about 5° C./min to 20° C. to produce a cooled SOFC cathode. The cooled secondary SOFC cathode is then heated to a temperature from about 600° C. to about 800° C. for less than twenty minutes then rapidly cooling to produce an infiltrated SOFC cathode.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

On embodiment of the method describes producing an infiltrated solid oxide fuel cell (SOFC) layer. The method begins by infiltrating a solution containing a solute into a SOFC layer to produce a primary SOFC layer. The primary SOFC layer is then in a heated environment, wherein the heated environment ranges in temperature from about 25° C. to about 100° C. to produce a dry primary SOFC layer. Vacuum and/or desiccator could be applied to facilitate the solution distribution and solvent evaporation. The dry primary SOFC layer is then cooled at a rate less than about 5° C./min to room temperature to produce a cooled primary SOFC layer. The cooled primary SOFC layer is then heated to a temperature greater than 500° C. then quenching to a temperature from about 10° C. to about 30° C. to produce an infiltrated SOFC layer.

Figure 1:
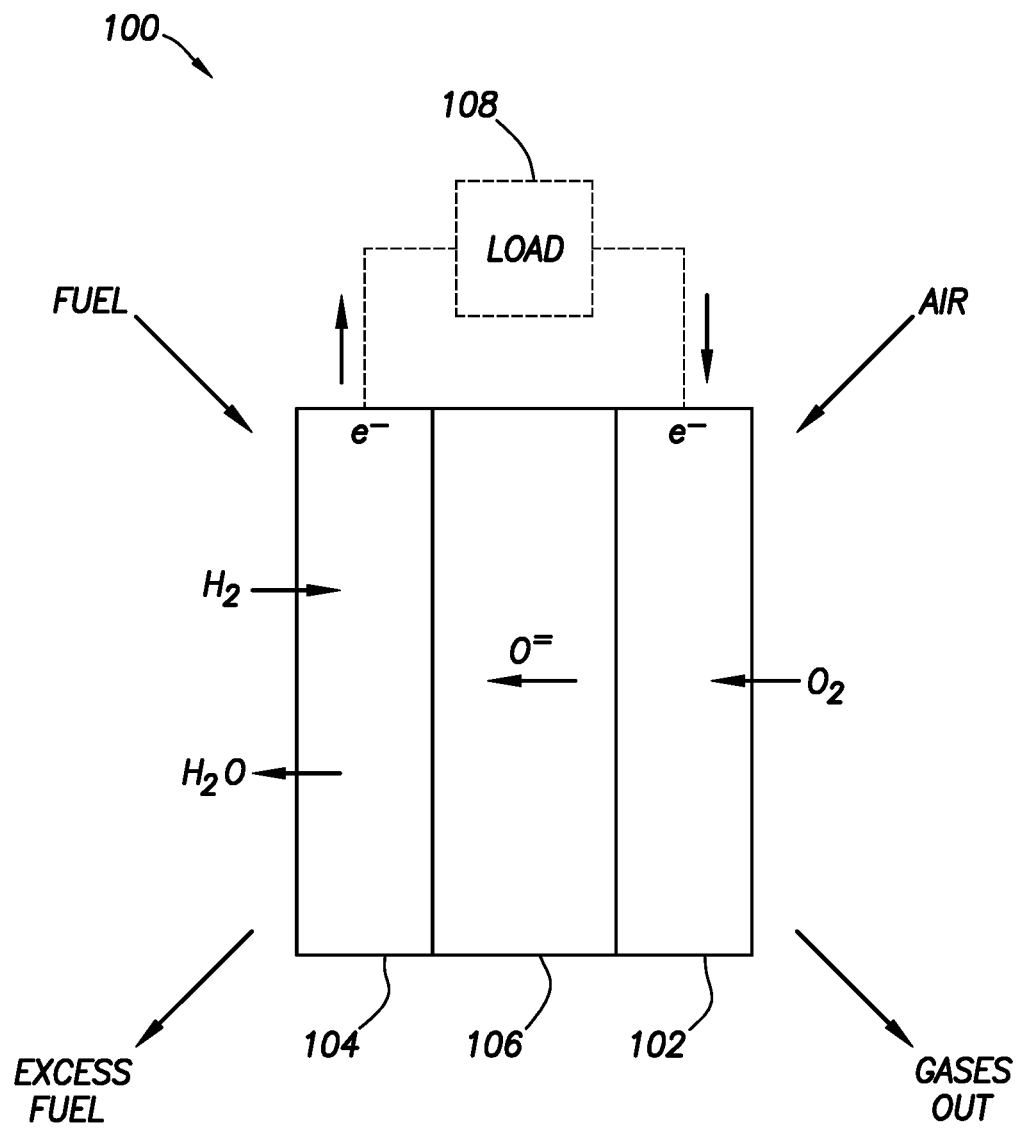
FIG. 1 depicts a schematic of a fuel cell.

FIG. 1 depicts a schematic block diagram of a conventional fuel cell 100. The illustrated fuel cell 100 includes a cathode 102, an anode 104, and an electrolyte 106. In general, the cathode 102 extracts oxygen ($O_2$) from an input oxidant (e.g., ambient air) and reduces the oxygen into oxygen ions. The remaining gases are exhausted from the fuel cell 100. The electrolyte 106 diffuses the oxygen ions from the cathode 102 to the anode 104. The anode 104 uses the oxygen ions to oxidize hydrogen ($H_2$) from the input fuel (i.e., combine the hydrogen and the oxygen ions). The oxidation of the hydrogen forms water ($H_2O$) and free electrons ($e^-$). The water exits the anode 104 with any excess fuel. The free electrons can travel through an external circuit (shown dashed with a load 108) between the anode 104 and the cathode 102. When combined with other fuel cells 100 within a fuel cell stack, the power generation capabilities of all of the solid oxide fuel cells 100 can be combined to output more power.

In one embodiment, the method infiltrates either the anode layer, the cathode layer, or the electrolyte layer of the SOFC. It is envisioned that the method can be used to infiltrate either just one layer or multiple layers of the SOFC. For one non-limiting example, it would be possible for the method to infiltrate just the cathode layer. In another non-limiting example, it would be possible for the method to infiltrate the cathode layer and the anode layer.

In one embodiment, the cathode materials chosen for the SOFC can be any conventionally known cathode capable of converting oxygen ($O_2$) from an input oxidant (e.g., ambient air) and reduces the oxygen into oxygen ions. Non-limiting examples of the cathode material can be perovskite materials, lanthanum manganite materials, lanthanum cobaltite and ferrite materials, ferro-cobaltite materials, and nickelate materials. Other more specific examples of cathode materials can be $Pr_{0.5}Sr_{0.5}FeO_{3-\delta}$; $Sr_{0.9}Ce_{0.1}Fe_{0.8}Ni_{0.2}O_{3-\delta}$; $Sr_{0.8}Ce_{0.1}Fe_{0.7}Co_{0.3}O_{3-\delta}$; $LaNi_{0.6}Fe_{0.4}O_{3-\delta}$; $Pr_{0.8}Sr_{0.2}Co_{0.2}Fe_{0.8}O_{3-\delta}$; $Pr_{0.7}Sr_{0.3}Co_{0.2}MnO_{0.8}O_{3-\delta}$; $Pr_{0.8}Sr_{0.2}FeO_{3-\delta}$; $Pr_{0.6}Sr_{0.4}Co_{0.8}Fe_{0.2}O_{3-\delta}$; $Pr_{0.4}Sr_{0.6}Co_{0.8}Fe_{0.2}O_{3-\delta}$; $Pr_{0.7}Sr_{0.3}Co_{0.9}Cu_{0.1}O_{3-\delta}$; $Ba_{0.5}Sr_{0.5}Co_{0.8}Fe_{0.2}O_{3-\delta}$; $SmO_{0.5}Sr_{0.5}CoO_{3-\delta}$; and $LaNi_{0.6}Fe_{0.4}O_{3-\delta}$. In one embodiment the cathode material is a mixture of gadolinium-doped ceria ($Ce_{0.9}Gd_{0.1}O_2$) and lanthanum strontium cobalt ferrite ($La_{0.6}Sr_{0.4}Co_{0.2}Fe_{0.8}O_3$) or a mixture of gadolinium-doped ceria (GDC) ($Ce_{0.9}Gd_{0.1}O_2$) and samarium strontium cobaltite (SSC), $Sm_{0.5}Sr_{0.5}CoO_3$.

In one embodiment, the electrolyte material chosen for the SOFC can be any conventionally known electrolyte capable of diffusing the oxygen ions from the cathode to the anode. Non-limiting examples of the electrolyte materials that can be used include yittria-stabilitzed zirconia, scandium-stabilized zirconia, gadolinium doped ceria, or lanthanum strontium magnesium gallate. Other more specific examples of electrolyte materials can be $(ZrO_2)_{0.92}(Y_2O_3)_{0.8}$, $Ce_{0.9}Gd_{0.1}O_2$, $Ce_{0.9}Sm_{0.2}O_2$, $La_{0.8}Sr_{0.2}Ga_{0.8}Mg_{0.2}O_3$, $BaZn_{0.1}Ce_{0.7}Y_{0.1}Yb_{0.1}O_3$.

In one embodiment, the anode material chosen for the SOFC can be any conventionally known anode material capable of using the oxygen ions to oxidize hydrogen ($H_2$) from the input fuel (i.e., combine the hydrogen and the oxygen ions). Non-limiting examples of anode material include mixtures of NiO, yttria-stabilized zirconia, gadolinium-doped ceria, CuO, CoO and FeO. Other more specific examples of anode materials can be a mixture of 50 wt. % NiO and 50 wt. % yttria-stabilized zirconia or a mixture of 50 wt. % NiO and 50 wt. % gadolinium-doped ceria.

In one embodiment, the solute is any chemical capable of being infiltrated into the SOFC that is able to influence fuel cell performance. Examples of different solutes include $PrCoO_3$, $La_2NiO_4$, $PrBaCo_2O_5$, $PrNi_{0.5}Fe_{0.5}O_3$, $Pr_{0.2}Ce_{0.8}O_2$, $Gd_{0.1}Ce_{0.9}O_2$, $Pr_{0.6}Sr_{0.4}CoO_3$, $Pr_{1-x}Sr_xMnO_3$, $PrSrCoMnO_6$, $La_{0.6}Sr_{0.4}MnO_3$, $La_{0.6}Sr_{0.4}Co_{0.2}Fe_{0.8}O_3$, $Sm_{0.5}Sr_{0.5}CoO_3$, $Ba_{0.5}Sr_{0.5}Co_{0.8}Fe_{0.2}O_3$, Ag, Pd. In one non-limiting example use of the solute used is $PrCoO_3$. Different ratios of Pr:Co can be used ratios can be used (first number is molar ratio of Pr, second number is molar ratio of Co) 1:5, 1:4, 1:3, 1:2, 1:1, 2:1, 3:1, 4:1, or even 5:1.

In one embodiment, the solvent is any chemical capable of being putting the solute into solution. Examples of different solutions include: deionized water, isopropyl alcohol, ethanol, i-propanol, n-propanol, ethylene glycol, 1,3-propanediol, 2-methoxyethanol, and acetic acid.

Depending on the type of infiltrated SOFC layer to be produced this method of infiltration can be repeated. In yet another embodiment, the method of producing an infiltrated solid oxide fuel cell (SOFC) cathode. The method begins by infiltrating a first solution containing a first solute into a SOFC cathode to produce a primary SOFC cathode. The primary SOFC layer is then dried in a heated environment, wherein the heated environment ranges in temperature from about 75° C. to about 100° C. to produce a dry primary SOFC layer. The dry primary SOFC layer is then at a rate ranging from about 1° C./min to about 5° C./min to room temperature to produce a cooled primary SOFC layer. The cooled primary SOFC layer is then heated to a temperature greater than 500° C. then quenched to a temperature from about 10° C. to about 30° C. to produce an infiltrated SOFC layer. A second solution containing a second solute is then infiltrated into the room temperature primary SOFC cathode to produce a secondary SOFC cathode. The secondary SOFC cathode is then subjected to a heated environment at a temperature from about 75° C. to about 100° C. for less than one hour to produce a dry secondary SOFC cathode. The heated secondary SOFC cathode is then cooled at a rate ranging from about 1° C./min to about 5° C./min to 20° C. to produce a cooled secondary SOFC cathode. The cooled secondary SOFC cathode is then heated to a temperature from about 600° C. to about 800° C. for less than twenty minutes then rapidly cooling to produce an infiltrated SOFC cathode.

In one embodiment, the heated environment can be a furnace or an oven. In other embodiments, the heated environment can range or from about 50° C. to about 100° C., from about 75° C. to about 100° C., or even from about 75° C. to about 90° C.

In certain embodiments where the method of infiltration is repeated the first solute and the second solute can be identical. In other embodiments where the method of infiltration is repeated the first solute and second solute can be different.

The following examples of certain embodiments of the invention are given. Each example is provided by way of explanation of the invention, one of many embodiments of the invention, and the following examples should not be read to limit, or define, the scope of the invention.

Infiltration Method:

Infiltration solutions were prepared by dissolving the metal nitrate hydrates in deionized water. The appropriate amount of metal nitrates was dissolved in the solvent to make a total metal ion concentration of 0.25 mole/L in the final solution. Ten percent of isopropyl alcohol (IPA) by volume was added to the infiltration solution to reduce surface tension and improve wettability of the solution on the SOFC cathodes. The composition of the precursors for synthesizing $PrCoO_3$ (Pr:Co 1:1) is shown below as table 1.

TABLE 1

| | |
|---|---|
| Solution concentration (mol/L) | 0.25 |
| Solution volume (mL) | 50 |
| $Pr(NO_3)_3 \cdot 6H_2O$ (g) | 5.438 |
| $Co(NO_3)_2 \cdot 6H_2O$ (g) | 3.638 |
| Citric acid (g) | 1.609 |
| IPA (g) | 2.160 |

$Pr_xCo_yO_3$ precursor solutions were infiltrated into a SSC-GDC cathode by using a micropipette. In alternate embodiments, a spray coater can be used to apply the infiltration solution for increased uniformity and consistency. The SSC-GDC cathode can be fabricated by following any conventionally known method.

For each round of cathode solution infiltration, different droplet volumes of 5.0 µL and 40 µL were applied on fuel cells with cathode areas of 1.44 and 12.25 $cm^2$, respectively. After each application, samples were dried in an oven at 90° C. for approximately 5 min. The solution loading was controlled at about 10 $\mu L \, cm^{-2}$ for each round of infiltration (for convenience, it was noted as one loading or 1×). Higher catalyst loading could be achieved by simply repeating the infiltration process multiple times.

The one-time infiltrated cells were annealed at different temperatures between 600 and 1000° C. for 2 h with a ramping rate of 3° C./min to study the heat-treatment-temperature effect. Various microstructures (particles or thin films) and crystal phases may form during the heat treatment. After each annealing temperature, a fast heating and cooling process similar to "quenching" was carried out to heat treat the infiltrated samples. During the quasi- "quenching" process, the oven-dried samples were placed in a furnace and were quickly heated to a temperature from about 600° C. to about 800° C. temperature and held for around 10 min before being cooled at a rapid rate of 20° C./min. The same infiltration procedure was repeated for subsequent loadings (2, 3, and 4×).

The volume of a one-time infiltration for an infiltration solution with a solute concentration of 0.25 mol/L was found to be around 10 µl/$cm^2$ when the solution was applied on the baseline SSC-GDC cathode backbone. In order to increase the loading of the catalysts, the infiltrated fuel cells can be annealed at high temperatures to burn out the organic components in the solution before the next round of infiltration. In one embodiment, a temperature of 600° C. or above should be sufficient to decompose the nitrates and burn out the organics.

Pr-to-Co Ratio

The Pr:Co ratio was modified while keeping other variables (e.g., heat treatment procedure and solute loading) fixed. The effect of Pr:Co ratio on fuel cell (Type 1) performance is shown in table II.

TABLE II

| Cathode composition and heat-treatment | Power density at 600° C., 0.65 V (mW/$cm^2$) | Improvement (%) | Power density at 500° C., 0.65 V (mW/$cm^2$) | Improvement (%) |
|---|---|---|---|---|
| SSC-GDC (Baseline) | 379 | — | 155 | — |
| Pr:Co 1:1 (1×)-SSC-GDC/in situ | 665 | 75 | 199 | 22 |
| Pr:Co 3:1(1×)-SSC-GDC/in situ | 478 | 26 | 110 | −41 |
| Pr:Co 1:3 (1×)-SSC-GDC/in situ | 556 | 47 | 150 | −3 |
| Co (1×)-SSC-GDC/in situ | 607 | 60 | 194 | 20 |

As shown in table II a fixed infiltration loading (1×) was used. Fuel cells with infiltrated $Pr_xCo_yO_3$ showed higher performance than that of the baseline cell. The cathode with Pr:Co=1:1 showed 75% performance improvement compared with the baseline cell at 600° C. and 0.65 V. The order of improvement from high to low was Pr:Co 1:1>Co>Pr:Co 1:3>Pr:Co 3:1. Type 1 cells were anode-supported GDC electrolyte cells with or without an additional GDC barrier layer. Thus, the performance differences between fuel cells were most likely the result of the different cathode material compositions.

Solute Loading

The effect of solute loading on fuel cell performance is presented in table II, based on SSC-GDC.

TABLE III

| Cathode composition and loadings | Power density at 650° C., 0.8 V (mW $cm^{-2}$) | Improvement percentage (%) | Power density at 750° C., 0.8 V (mW $cm^{-2}$) | Improvement percentage (%) |
|---|---|---|---|---|
| SSC-GDC | 305 | — | 614 | — |
| Pr:Co 1:1 (1×)-SSC-GDC/800° C. | 430 | 41 | 734 | 20 |
| Pr:Co 1:1 (2×)-SSC-GDC/800° C. | 538 | 76 | 822 | 34 |

TABLE III-continued

| Cathode composition and loadings | Power density at 650° C., 0.8 V (mW cm$^{-2}$) | Improvement percentage (%) | Power density at 750° C., 0.8 V (mW cm$^{-2}$) | Improvement percentage (%) |
|---|---|---|---|---|
| Pr:Co 1:1 (3×)-SSC-GDC/800° C. | 617 | 102 | 833 | 36 |
| Pr:Co 1:1 (4×)-SSC-GDC/800° C. | 334 | 10 | 713 | 16 |

As shown in the table, the performance of the baseline fuel cell was improved by 41, 76, and 102% when the cathode was infiltrated one, two, and three times, respectively. Surface coverage and percolation status of the new Pr:Co 1:1 materials are theorized to be controlled by the number of infiltrations. In order to take advantage of the superior electrical conductivity of Pr:Co 1:1, formation of a continuous network of Pr:Co 1:1 is essential. However, overloading of Pr:Co 1:1 (4×) could cause severe coarsening/agglomeration of the nanoparticles, which in turn could increase the electron/ions transport path and diminish the performance-boosting effect of Pr:Co 1:1. In addition, too many rapid heat treatments may form thermal stress or microcracks inside the fuel cells. Furthermore, excessive precursor material may diffuse through the porous GDC buffer layer and react with the YSZ electrolyte to produce detrimental phases. Therefore, the amount of material infiltrated into the cathode backbones should be carefully controlled to achieve the best performance.

To reduce the number of infiltrations while keeping sufficient solute loading, a higher concentration solution could be used. However, the use of high concentrations of metal salts also requires increasing the amount of chelating agents such as citric acid, which in turn will further increase the viscosity of the solution and make it more difficult to obtain uniform, homogeneous coatings.

Annealing

The heat treatment process after infiltration is theorized to control the particle sizes, morphology, and crystallinity of coating materials. Fine particles are usually produced during low-temperature annealing, while continuous thin films or core-shell structures are preferentially formed at high treatment temperatures. To study the effect of annealing temperature on the microstructure and electrochemical properties of the PC11 coating, symmetrical cells (SSC-GDC) were fabricated. The SSC-GDC cathode was infiltrated with Pr:Co 1:1 solution and annealed in the temperature range of 600-1000° C. Electrochemical testing was conducted between 500 and 750° C. The area-specific resistances (ASR) data are shown in table IV.

TABLE IV numbers in Ω·cm$^{-2}$

| | Annealing temperature, ° C. | | | | |
|---|---|---|---|---|---|
| | 500 | 550 | 650 | 600 | 600 |
| | Experiment time, hours | | | | |
| | 113 | 113 | 113 | 0 | 113 |
| SSC-GDC (baseline) | 1.48 | 0.46 | 0.079 | 0.16 | 0.179 |
| Pr:Co 1:1 (1×)-SSC-GDC/600° C. | 0.39 | 0.19 | 0.045 | 0.09 | 0.113 |
| Pr:Co 1:1 (1×)-SSC-GDC/700° C. | 0.84 | 0.27 | 0.054 | 0.122 | 0.129 |
| Pr:Co 1:1 (1×)-SSC-GDC/800° C. | 0.95 | 0.32 | 0.064 | 0.146 | 0.156 |
| Pr:Co 1:1 (1×)-SSC-GDC/1000° C. | 1.92 | 0.90 | 0.16 | 0.356 | 0.408 |

The Pr:Co 1:1 (1×)—SSC-GDC/600° C. cathode showed the lowest polarization resistances of 0.39 and 0.11 Ω·cm$^2$ at 500° C. and 600° C. and 74 and 42% reduction, respectively, compared with the baseline SSC-GDC cathode at the same temperatures. Most Pr:Co 1:1-infiltrated cells were more stable than the uncoated baseline cell except for the cell with a Pr:Co 1:1 coating that was heat treated at 1000° C.

The multi-infiltration process was very time consuming because each time the furnace had to be ramped up to the high temperature set point and then cooled to room temperature at a relatively slow rate (i.e., 1-5° C./min). Each heat-treatment cycle took at least 24 h to complete. In addition, nanoparticles started to agglomerate during the slow heat-treatment process, which led to a reduction in active sites as well as surface area. An effort was made to minimize the process time and preserve the nanofeatures of the infiltrated materials. After each infiltration, samples were dried in an oven and immediately put into a furnace that was already heated to 600-800° C. After 15 min of dwelling, samples were immediately taken out of the furnace and cooled to room temperature. This fast heating and cooling process was similar to the "quenching" method widely used in the metallurgy industry, which is used to prevent grain growth and avoid undesired phase transformation.

Figure 2:
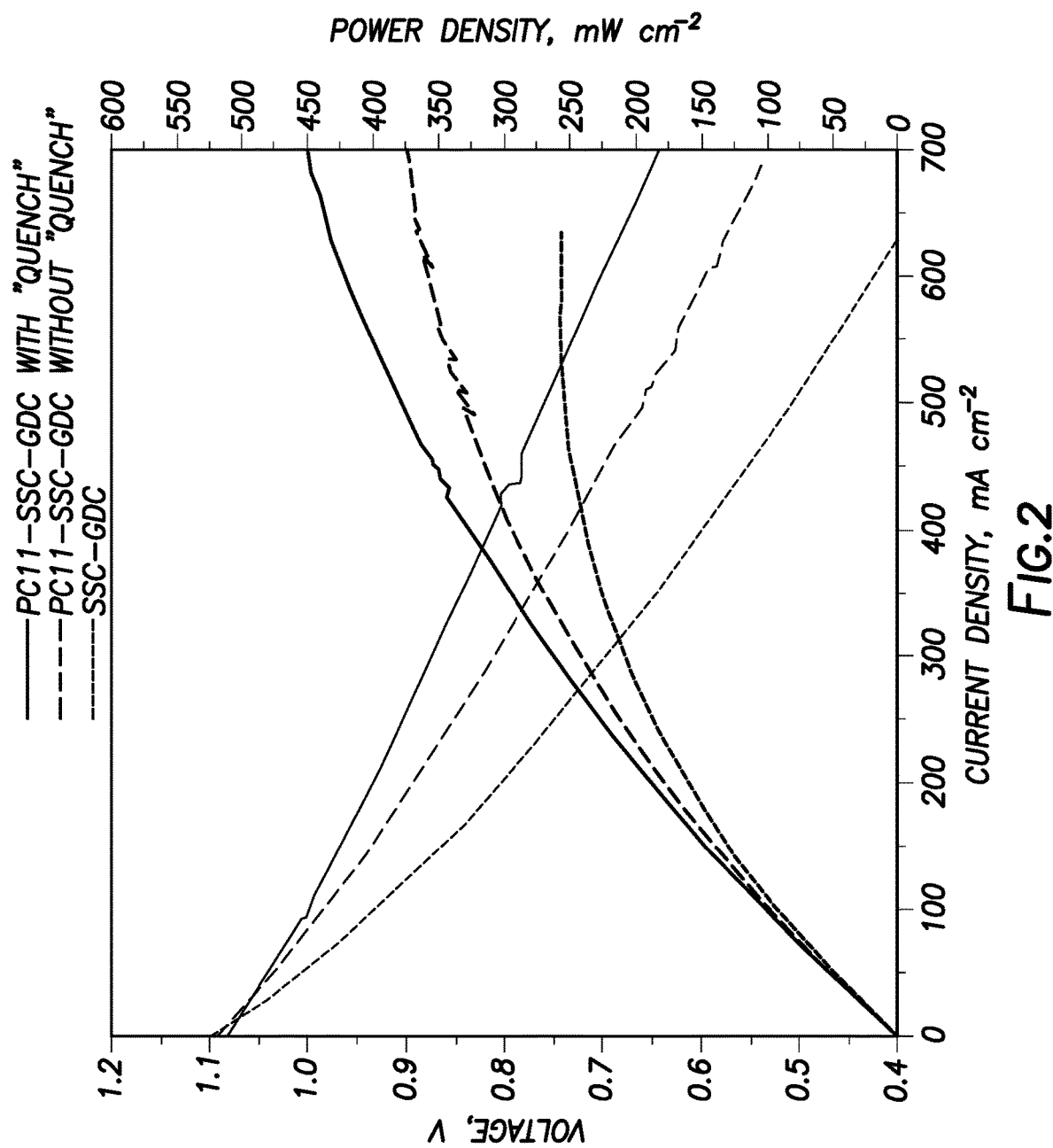
FIG. 2 depicts results of fuel cell testing.

Fuel cell performance was dramatically improved by this quasi-"quenching" method, especially at lower operating temperatures. The fuel cell with the Pr:Co 1:1 (2×)—SSC-GDC cathode showed a powder density of 336.9 mW/cm$^2$ at 600° C. and 0.8V, which was 35.5% higher than that of the fuel cell without "quenching" (248.6 mW/cm$^2$) as shown in FIG. 2.

Tests on 2" Fuel Cells

The performance of 2" fuel cells with a cathode area of 12.25 cm$^2$ is shown in table V.

TABLE V

| Cathode composition and heat-treatment | Power density at 650° C., 0.8 V (mW cm$^{-2}$) | Improvement percentage (%) | Power density at 750° C., 0.8 V (mW cm$^{-2}$) | Improvement percentage (%) |
|---|---|---|---|---|
| SSC-GDC | 262 | — | 545 | — |
| Pr:Co 1:1 (1×)-SSC-GDC/800° C. | 347 | 32 | 574 | 5 |
| Pr:Co 1:1 (2×)-SSC-GDC/800° C. | 357 | 36 | 627 | 15 |

It was not straightforward to achieve more than 20% performance improvement in large cells by using the infiltration technique. However, greater than 30% performance enhancement at 650° C. has been achieved in our experiments by using Pr:Co 1:1 infiltration. Double infiltration (2×) was found to significantly improve cell performance at a higher operation temperature of 750° C.

Fuel Cell Stability

Figure 3:
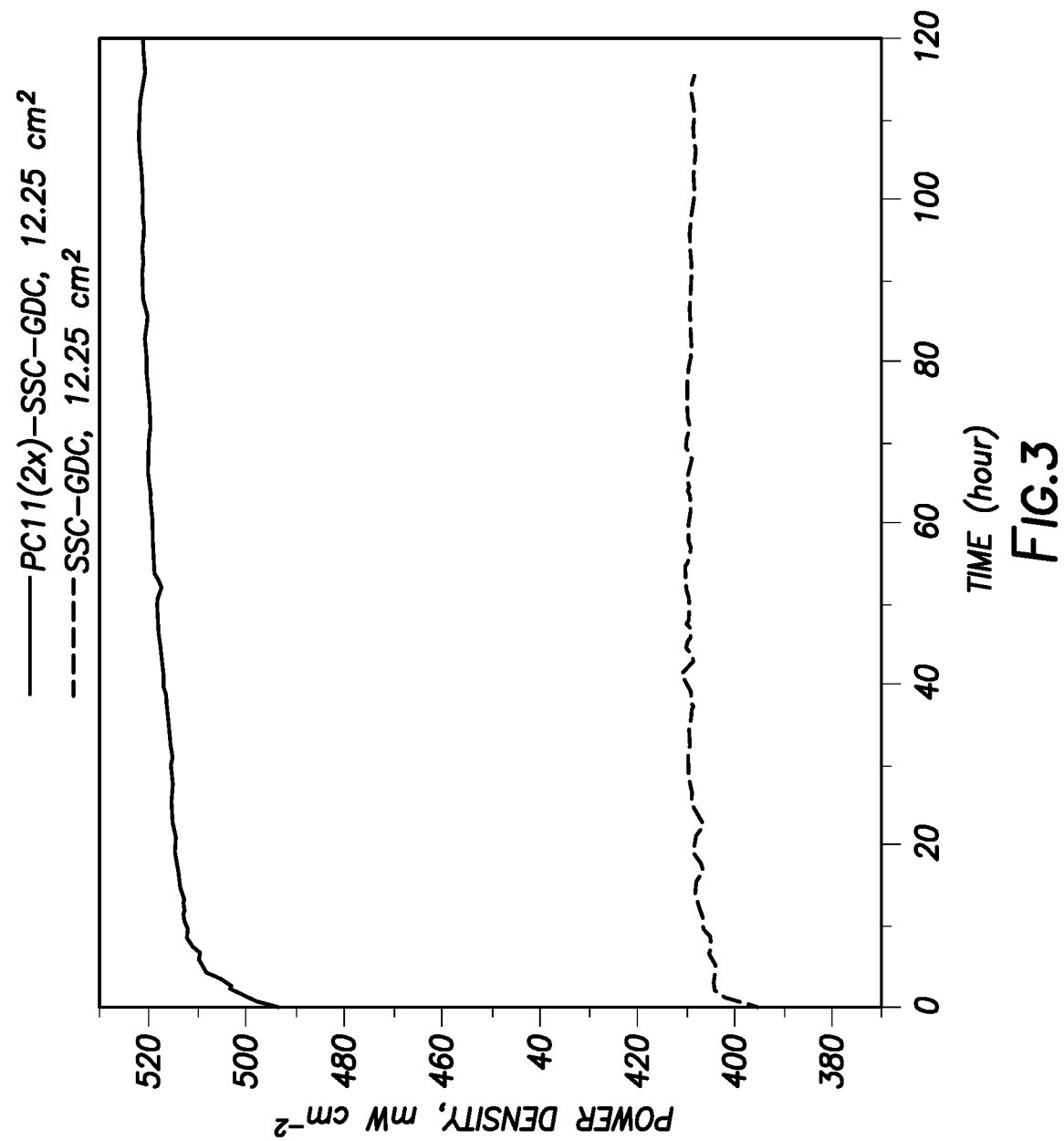
FIG. 3 depicts results of fuel cell testing.

FIG. 3 shows short-term (~120 h) test results of fuel cells with the SSC-GDC baseline cathode and Pr:Co 1:1 double infiltrated (2×) and 800° C. annealed cathode. Both cells were taken from the same fabrication batch and had the same cathode area of 12.25 cm². No obvious degradation was observed in either cell during the 120 h of testing.

Because the annealing was carried out at a much higher temperature of 800° C., the nanostructured feature of the Pr:Co 1:1-infiltrated cathode remained unchanged during fuel cell testing (650° C.). Further reduction of fuel cell operating temperature would significantly improve the stability of Pr:Co 1:1-coated cathodes.

Testing was continued for a total of 350 h. The microstructure of the cell was analyzed by SEM. The SSD-GDC cathode backbone and the GDC barrier layer were covered with a continuous network of Pr- and Co-rich 50-60 nm diameter particles, indicating that no particle growth or coarsening occurred during the 350 h of testing. Because Pr—Co nanoparticles are present in the GDC barrier layer, the significant reduction in the ohmic resistance could be attributed to that highly conductive Pr—Co material permeated into the porous GDC barrier layer.

New Cathode Functional Layer

The thickness of the GDC barrier layer was around 2 μm. Ideally, the GDC barrier layer should be fully dense to minimize ohmic resistance and to prevent cathode species (i.e., Sr and Co) from contacting the YSZ electrolyte. However, it is extremely difficult to fully densify the thin GDC barrier layer at temperatures below 1300° C. by using traditional sintering methods. When the sintering temperature is above 1300° C., GDC would readily react with the YSZ electrolyte and produce low-conductivity phases. Due to the porous nature of the GDC barrier layer, the Pr—Co solution may enter the GDC layer during infiltration. Once the GDC layer is saturated with the solution, the excess Pr—Co solution accumulates at the bottom of the cathode, forming a new thin interfacial layer between the GDC barrier layer and the cathode. We believe that the enormous performance-boosting effect of the PC11 not only comes from the nanostructured surface coating on the cathode, but also is related to this new interfacial layer, which could reduce both polarization and ohmic resistances.

Figure 4:
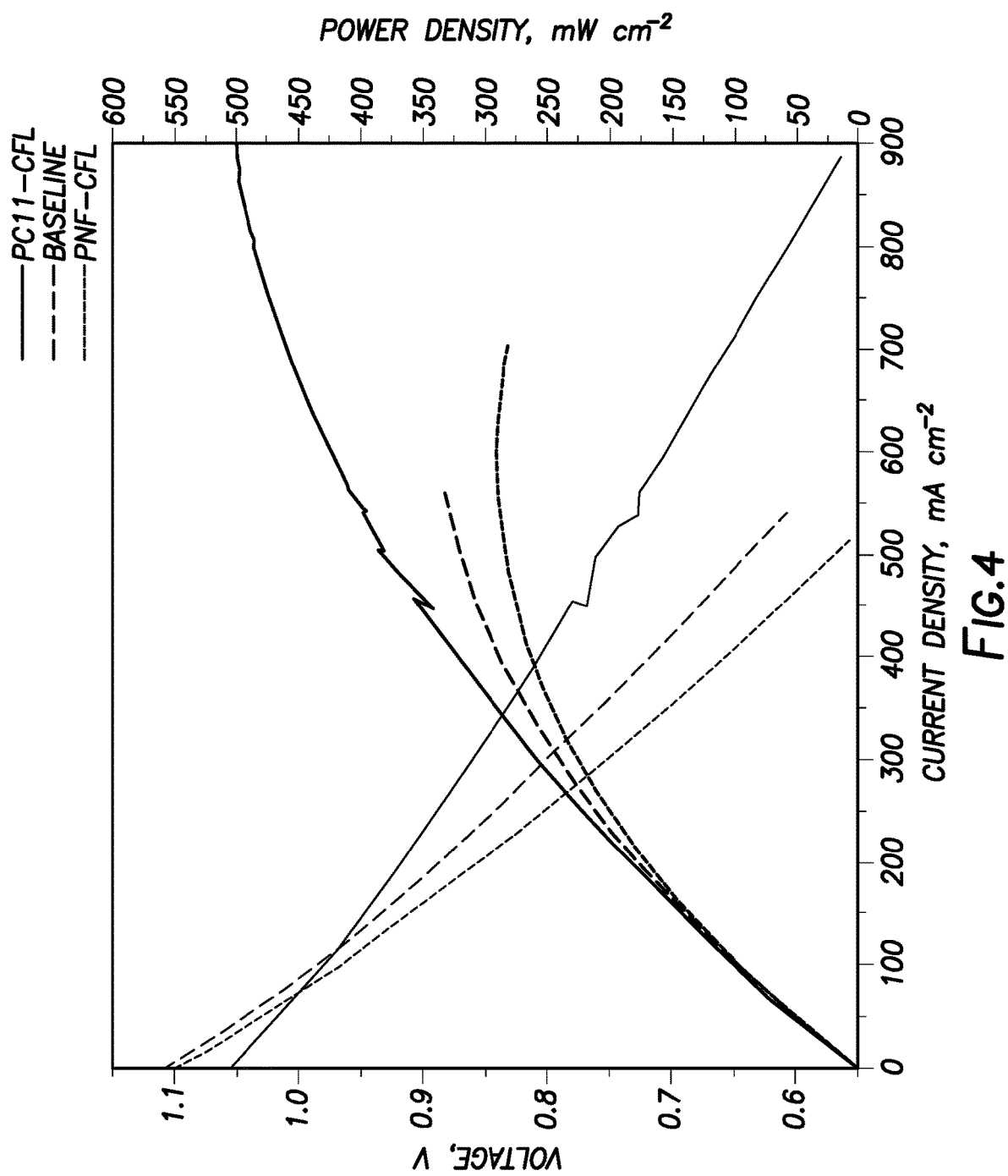
FIG. 4 depicts results of fuel cell testing.

Two fuel cell samples without the SSC-GDC (they had only anode, electrolyte, and the GDC barrier layer) and coated the GDC barrier layer with Pr:Co 1:1 and PrNi$_{0.5}$Fe$_{0.5}$O$_3$ solutions. After drying, samples were exposed to 600° C. and then were quickly cooled to room temperature. A thin black film of the Pr:Co 1:1 was formed on the surface of the GDC barrier layer. We assigned this new layer the name "cathode functional layer" (CFL). The SSC-GDC cathode was then spray coated onto the CFL and sintered at 950° C. using the same sintering schedule as for the baseline cathode. In this case, the additional CFL was also heat treated at 950° C. The completed fuel cells were tested, and their performance was compared with that of the baseline cells. The PrNi$_{0.5}$Fe$_{0.5}$O$_3$ cathode functional layer slightly reduced the fuel cell performance. However, the Pr:Co 1:1 functional layer actually boosted the baseline cell performance by 37% at 650° C. and 0.8 V as shown in FIG. 4.

Figure 5:
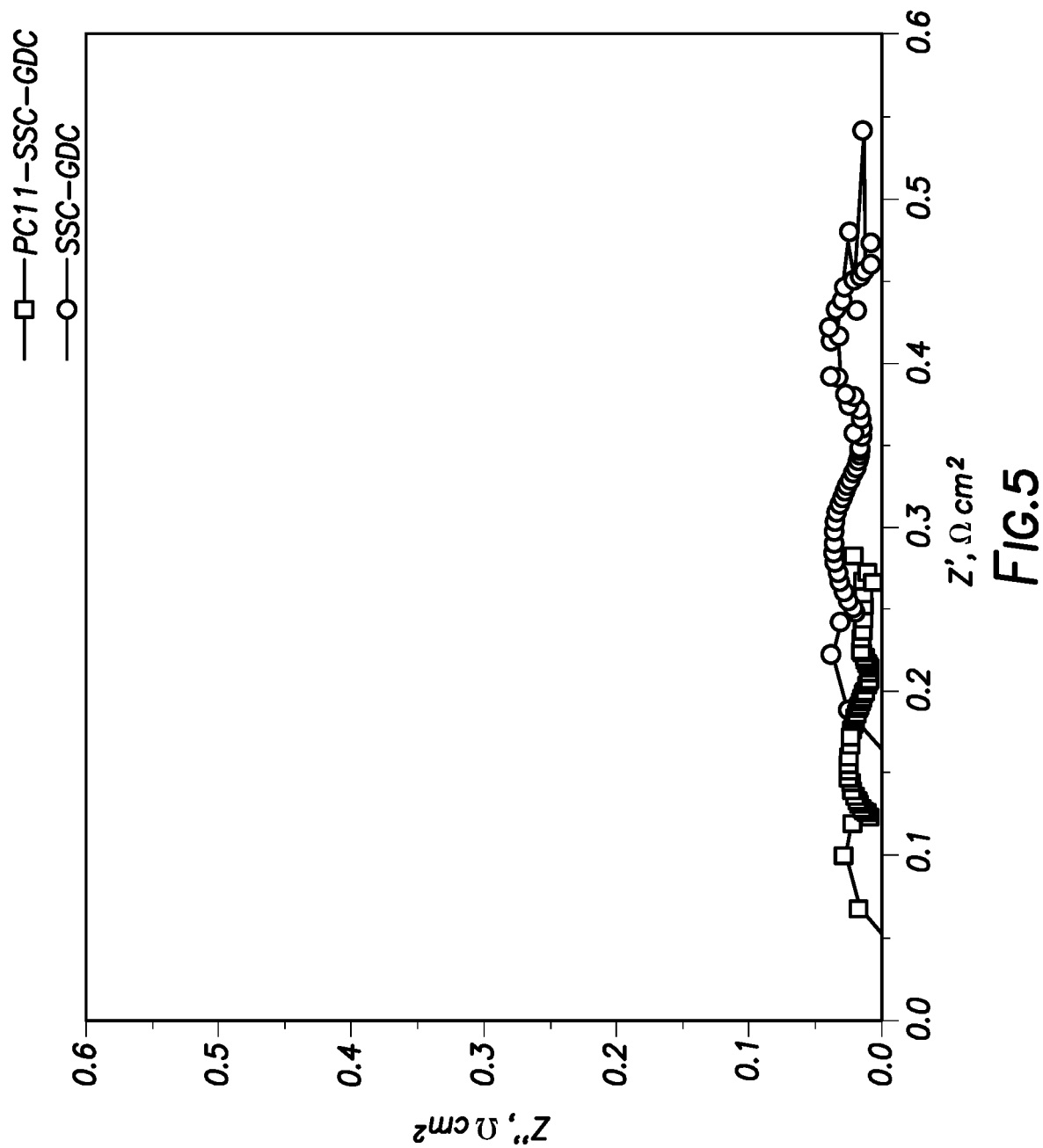
FIG. 5 depicts results of fuel cell testing.

FIG. 5 shows the impedance spectra of a baseline fuel cell with an SSC-GDC cathode and fuel cell with Pr:Co 1:1 (2×)—SSC-GDC/800° C. after operation for 120 h at 650° C. and 0.8 V. The bulk and polarization resistance were reduced from 0.24 and 0.22 Ωcm² for the baseline cell to 0.13 and 0.14 Ωcm² for fuel cells with the Pr:Co 1:1 (2×)—SSC-GDC/800° C. cathode. The fuel cell performances are shown in Table VIII. The symmetric cell test results (Table IV) showed that annealing at 1000° C. increased the polarization resistance of the Pr:Co 1:1 infiltrated SSC-GDC. However, the initial fuel cell performance of the 1000° C. annealed cathode was still significantly higher than that of the baseline cell and the cells treated at lower temperatures as shown in Table VI.

TABLE VI

| Cathode composition and heat-treatment | Power density at 650° C., 0.8 V (mW cm$^{-2}$) | Improvement percentage (%) | Power density at 750° C., 0.8 V (mW cm$^{-2}$) | Improvement percentage (%) |
|---|---|---|---|---|
| LSCF-GDC | 285 | — | 580 | — |
| SSC-GDC | 305 | — | 614 | — |
| Pr:Co 1:1 (1×)-SSC-GDC/600° C. | 400 | 31 | 700 | 14 |
| Pr:Co 1:1 (1×)-SSC-GDC/800° C. | 430 | 41 | 734 | 20 |

TABLE VI-continued

| Cathode composition and heat-treatment | Power density at 650° C., 0.8 V (mW cm$^{-2}$) | Improvement percentage (%) | Power density at 750° C., 0.8 V (mW cm$^{-2}$) | Improvement percentage (%) |
| --- | --- | --- | --- | --- |
| Pr:Co 1:1 (1×)-SSC-GDC/1000° C. | 444 | 46 | 727 | 18 |

Figure 6:
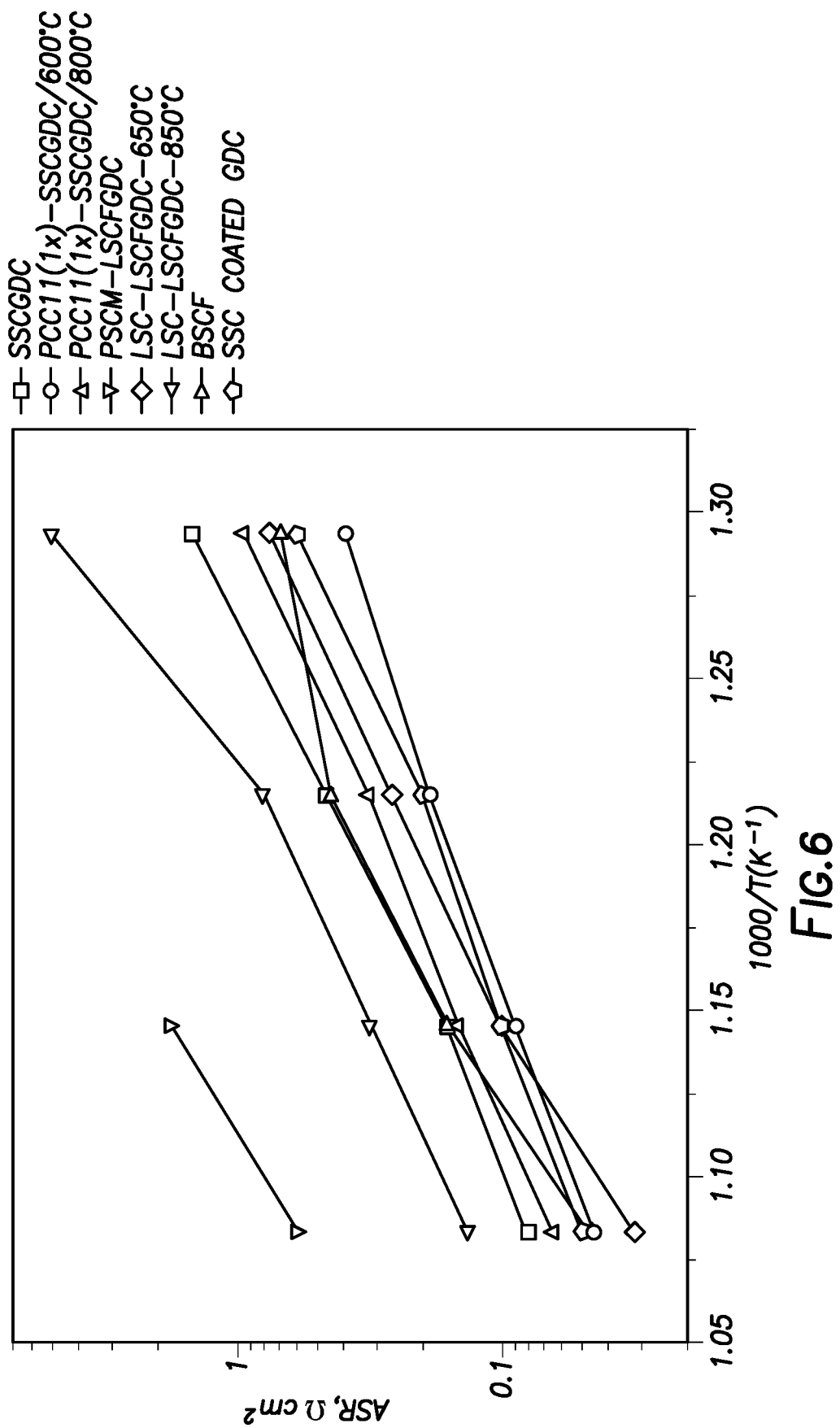
FIG. 6 depicts results of fuel cell testing.
Figure 7:
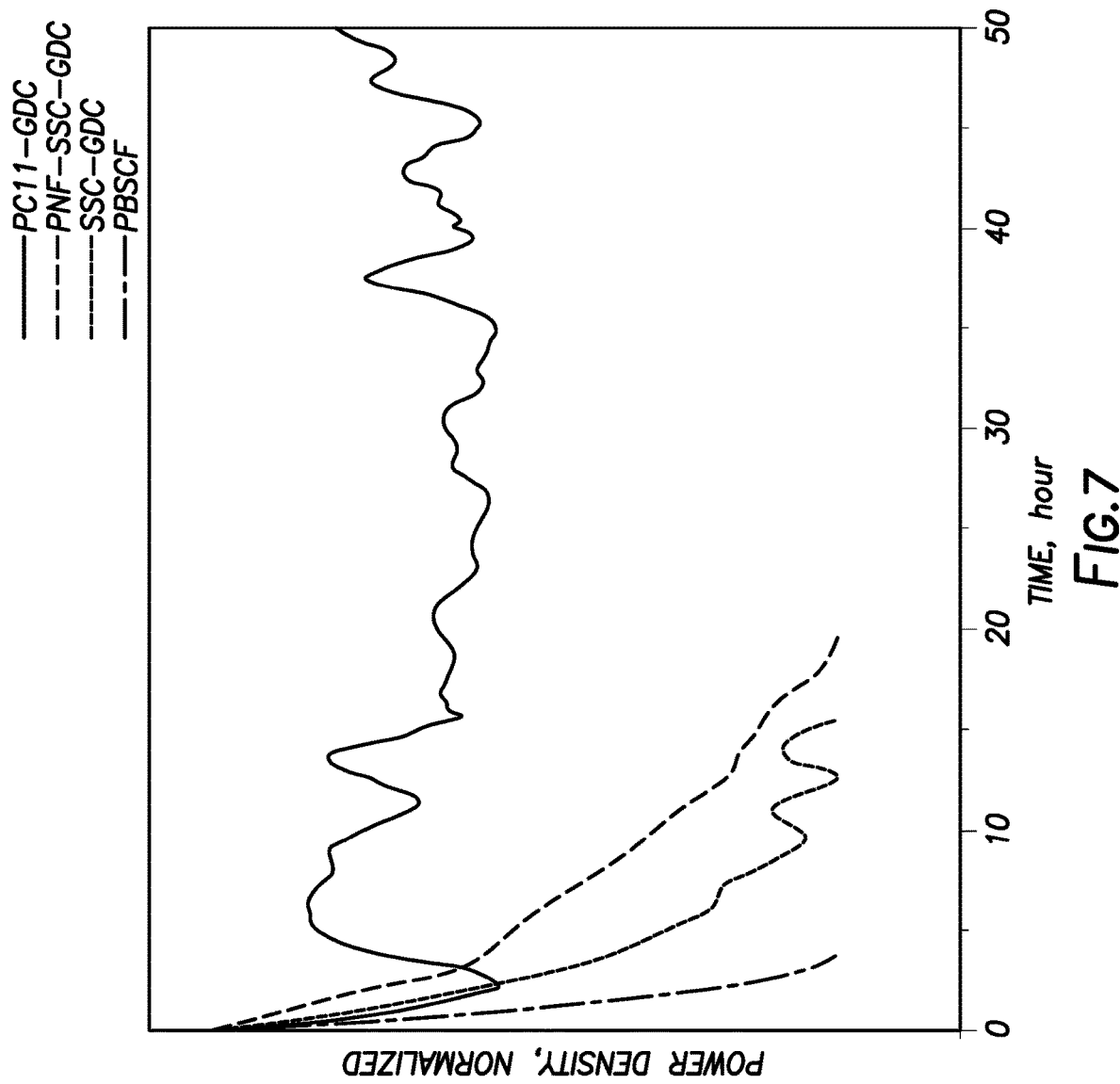
FIG. 7 depicts results of fuel cell testing.
Figure 8:
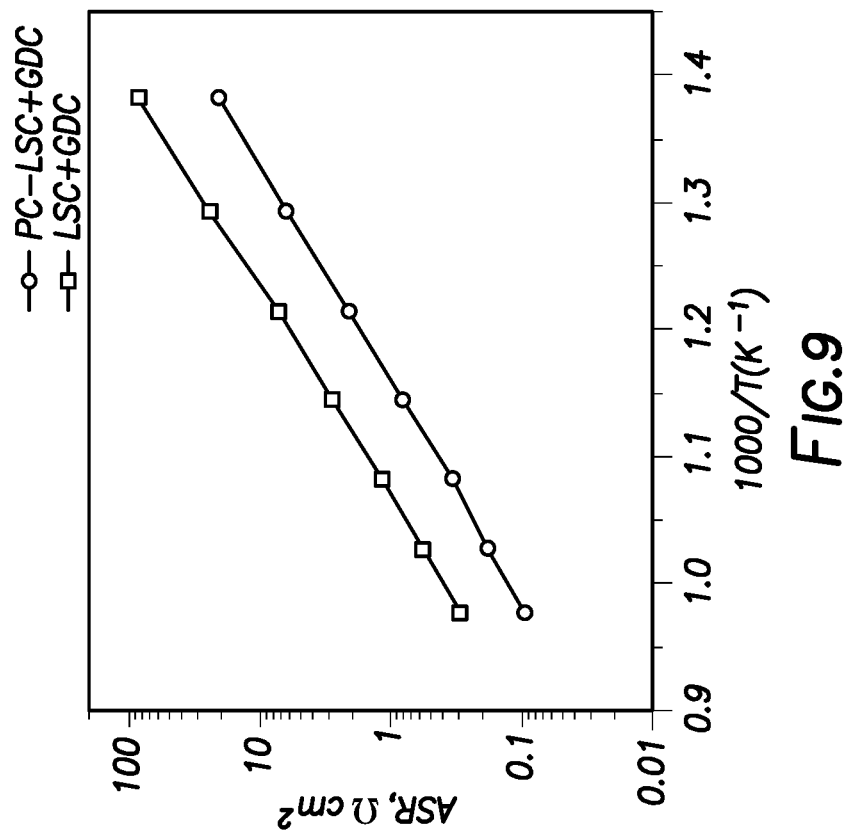
FIG. 8 depicts results of fuel cell testing.
Figure 9:
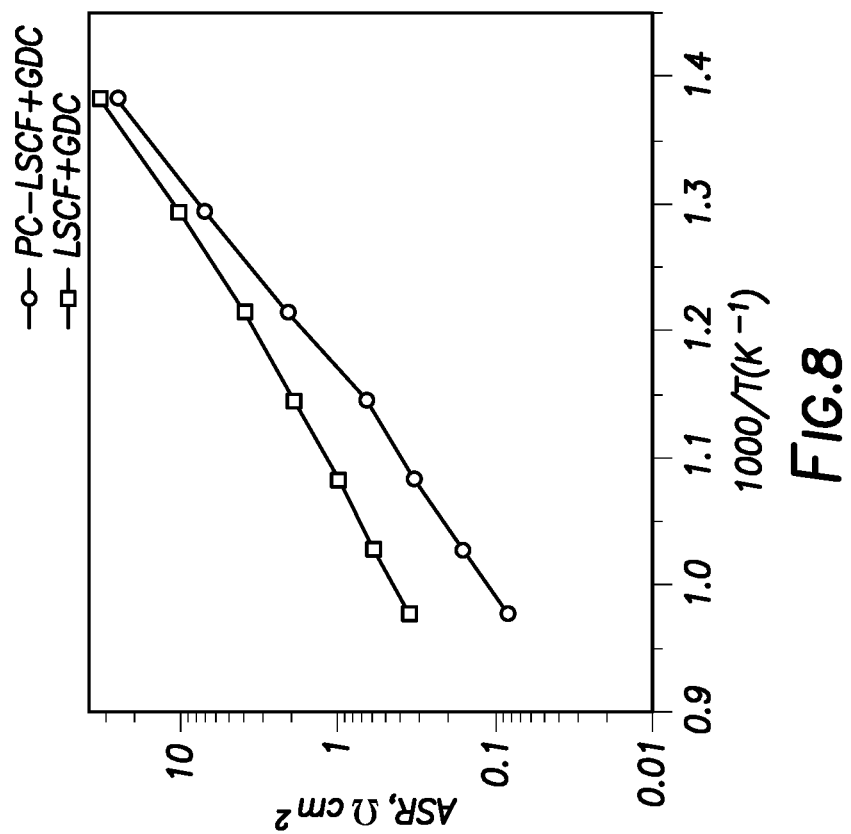
FIG. 9 depicts results of fuel cell testing.
Figure 11:
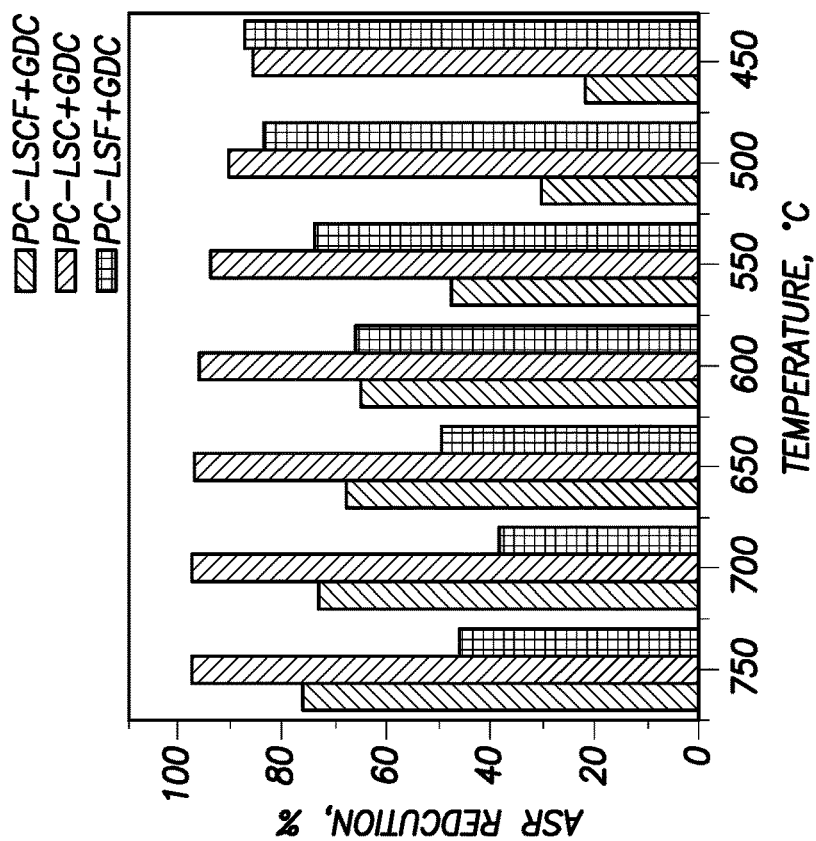
FIG. 11 depicts results of fuel cell testing.
Figure 10:
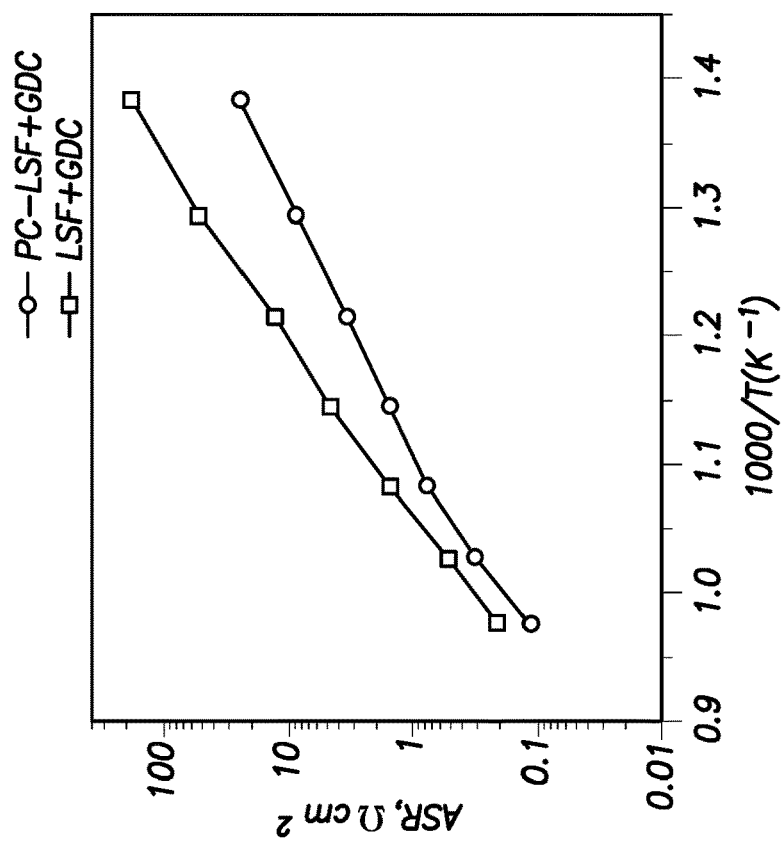
FIG. 10 depicts results of fuel cell testing.

FIG. 6 depicts the ASRs of a Pr:Co 1:1-coated SSC-GDC cathode together with other infiltrated high-performing cathodes reported in the literature. The Pr:Co 1:1-infiltrated SSC-GDC cathode showed an ASR that was 48, 43, and 10% lower, respectively, than those of LSC-coated LSCF-GDC, BSCF, and SSC-coated GDC at 600° C. The Pr:Co 1:1-coated (2× infiltration and 800° C. annealing) fuel cell showed 64 and 68% higher power densities than PBSCF and PNF-infiltrated fuel cells as shown in Table VII.

TABLE VII

| Cathode composition and heat-treatment | Power density at 650° C., 0.8 V (mW cm$^{-2}$) | Improvement percentage (%) | Power density at 750° C., 0.8 V (mW cm$^{-2}$) | Improvement percentage (%) |
| --- | --- | --- | --- | --- |
| SSC-GDC (baseline) | 380 | — | 614 | — |
| PBSCF | 437 | 15 | 706 | 15 |
| PNF (1×)-SSC-GDC | 427 | 12 | 685 | 12 |
| Pr:Co 1:1 (2×)-SSC-GDC/800° C. | 720 | 89 | 1099 | 79 |
| PSC (2×)-SSC-GDC/800° C. | 556 | 46 | 1069 | 74 |

In the accelerated stability testing with 1.6% $CO_2$ in air, the Pr:Co 1:1-GDC cathode showed no degradation in 50 h of testing, while all the other cathode materials, including PBSCF, SSC-GDC, and PNF-coated SSC-GDC, suffered from rapid performance degradation as depicted in FIG. 6. The PNF-coated SSC-GDC did show better stability than the other two advanced cathode materials, PBSCF and SSC-GDC. The initial performance of the new Pr:Co 1:1-GDC cathode was at the same level as that of the SSC-GDC cathode, but with much better stability in a $CO_2$ environment.

Pr:Co 1:1 was also infiltrated into other common cathode materials including LSCF+GDC, LSC+GDC, and LSF+GDC, and their performance is summarized in FIG. 8, FIG. 9, FIG. 10 and FIG. 11. The polarization resistance of all these cathodes was dramatically reduced at temperatures from 450 to 750° C., and the amount of reduction ranged from 20 to 90%. The LSCF+GDC composite cathode is the most widely used cathode in the SOFC industry because of its relatively high performance and good stability. FIG. 8-FIG. 11 shows that more than 60% performance improvement was achieved when the LSF cathode was surface infiltrated with Pr:Co 1:1 solution and annealed at 600° C. At a lower operating temperature of 500° C., the promotion effect was more significant—more than 80% of the polarization resistance was reduced.

Figures 12, 13:
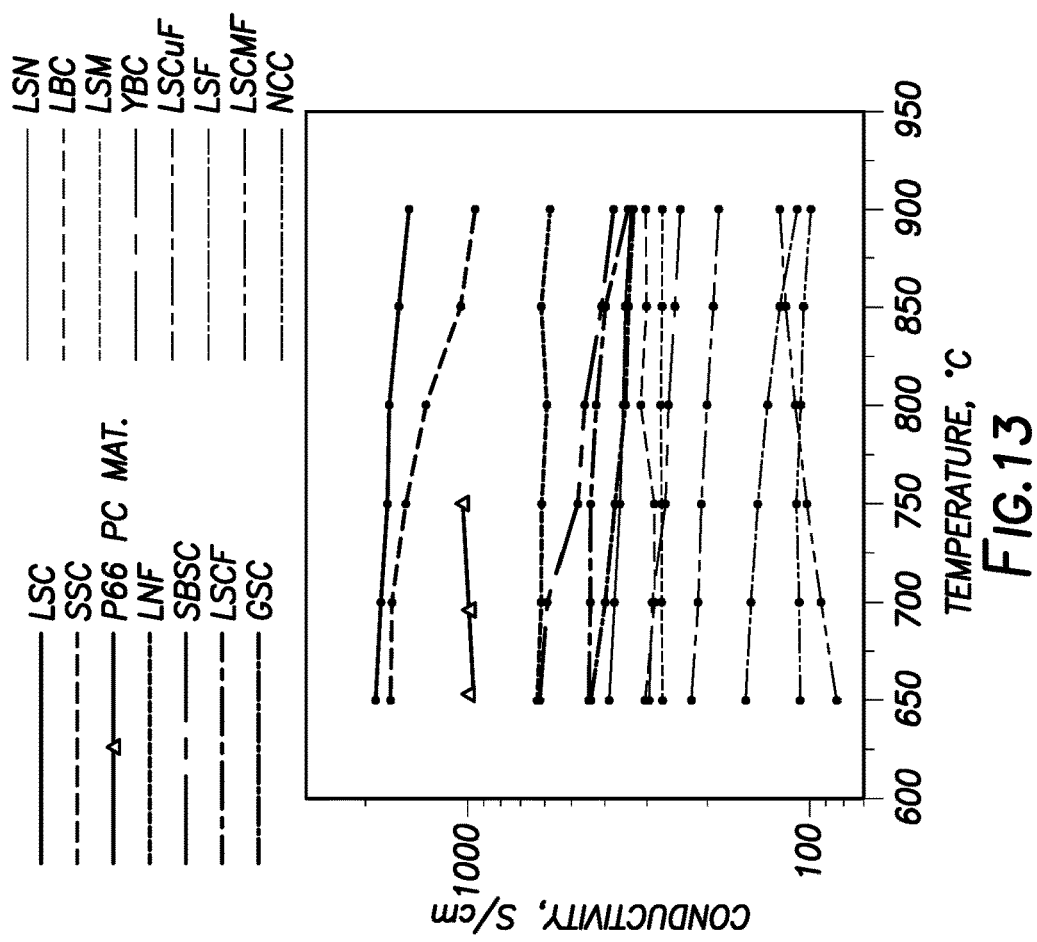
FIG. 12 depicts results of fuel cell testing.
FIG. 13 depicts results of fuel cell testing.

The temperature dependence of the electrical conductivity for Pr:Co 1:1 is depicted in FIG. 12 and FIG. 13. The conductivity of Pr:Co 1:1 was also compared with other advanced cathode materials reported in the literature FIG. 13. The Pr:Co 1:1 cathode showed higher conductivities than most other cathode materials except for SSC and LSC. Both SSC and LSC contain high levels of alkaline earth metals and easily react with $CO_2$ and $H_2O$ in ambient air.

The microstructure of a tested fuel cell with Pr:Co 1:1 infiltrated cathode was tested to show a network of PrCoOx nano particles around 50 nm presents inside both the SSC-GDC cathode layer and the GDC barrier layer, and the interface between GDC barrier layer and PrCoOx-SSC-GDC cathode layer. It is theorized that the well persevered nano features were related to the "Quenching" heat treatment. After the "Quenching" process, PrCoOx nano particle network could generate more active sites and significantly reduce the interfacial resistance and boost the performance.

The element distribution of the Pr:Co 1:1 modified SSC-GDC cathode surface after 300 h fuel cell operation was tested to show that the PrCoOx nano network was preserved and uniformly covered the entire SSC-GDC cathode surface. The element distribution of the Pr:Co 1:1 modified GDC barrier layer indicates that the PrCoOx nano network could be well distinguished inside the GDC barrier layer. More active sites were created by treating PrCoOx nano particles on the GDC backbone, thus higher fuel cell performance was achieved by using the PC11-CFL and SSC-GDC cathode.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
infiltrating a first solution containing a first solute into a solid oxide fuel cell (SOFC) cathode to produce a primary SOFC cathode;
drying the primary SOFC cathode in a heated environment at a temperature from about 25° C. to about 100° C. for less than one hour to produce a dry primary SOFC cathode; cooling the dry primary SOFC cathode at a rate ranging from about 1° C./min to about 5° C./min to room temperature to produce a cooled primary SOFC cathode;
heating the cooled primary SOFC cathode, to a temperature from about 600° C. to about 800° C. for less than twenty minutes then rapidly cooling to produce a room temperature primary SOFC cathode;
infiltrating a second solution containing a second solute into the room temperature primary SOFC cathode to produce a secondary SOFC cathode;
subjecting the secondary SOFC cathode to a heated environment at a temperature from about 25° C. to about 100° C. for less than one hour to produce a dry secondary SOFC cathode;
cooling the heated secondary SOFC cathode at a rate ranging from about 1° C./min to about 5° C./min to 20° C. to produce a cooled SOFC cathode; and
heating the cooled secondary SOFC cathode, to a temperature from about 600° C. to about 800° C. for less than twenty minutes then rapidly cooling to produce an infiltrated SOFC cathode.

2. The method of claim 1, wherein the first solute is $PrCoO_3$.

3. The method of claim 1, wherein the second solute is $PrCoO_3$.

4. The method of claim 1, wherein the first solute and the second solute are identical.

5. The method of claim 1, wherein the first solute and the second solute are different.

* * * * *